April 7, 1964   H. H. SOMMERS   3,127,717
GRINDER ATTACHMENT FIXTURE
Filed May 27, 1963
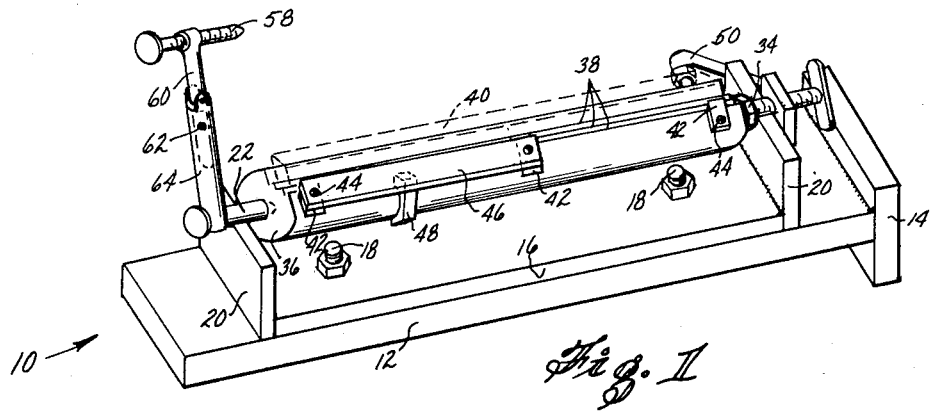
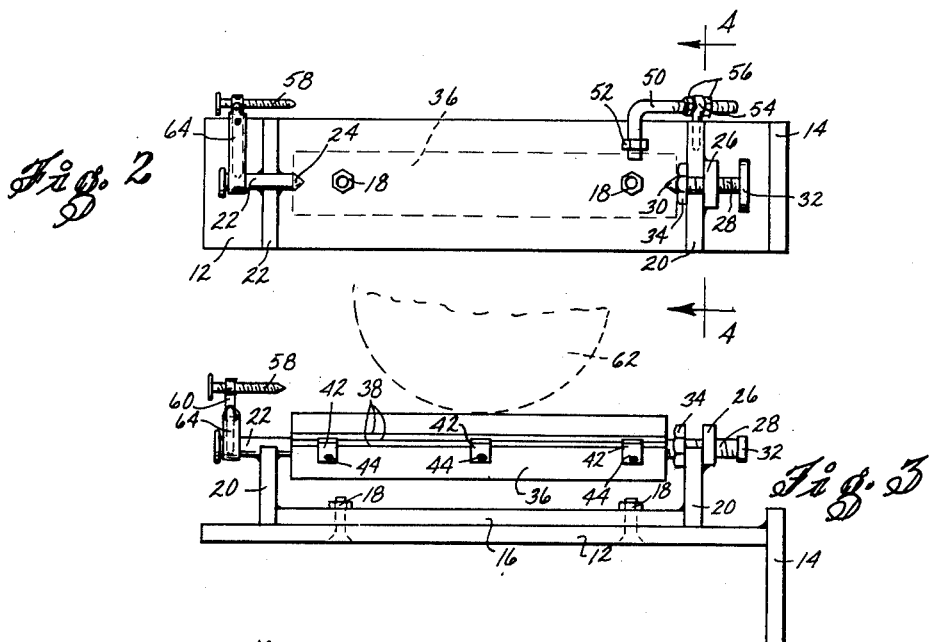
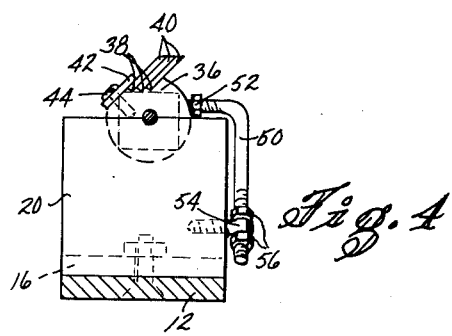
INVENTOR
Harry H. Sommers

United States Patent Office 3,127,717
Patented Apr. 7, 1964

3,127,717
GRINDER ATTACHMENT FIXTURE
Harry H. Sommers, 628 Lincoln Ave., Lincoln, Ill.
Filed May 27, 1963, Ser. No. 283,426
2 Claims. (Cl. 51—218)

This invention relates to machine tools and, more particularly, to a grinder attachment fixture.

It is an object of the present invention to provide a grinder attachment fixture which can be conveniently used with a radial type saw in which the saw blade is replaced by a grinding wheel.

A further object of the present invention is to provide a fixture of the type described which can be conveniently used for grinding various types of tool blades, such as planer blades, chisels, hand plane blades, and the like.

Still another object of the present invention is to provide a grinder attachment fixture of the aforementioned type which can be accurately adjusted to obtain the desired grinding angle, and which can simultaneously grind a plurality of tool blades in a safe and effective manner.

Still an additional object of the present invention is to provide a grinder attachment fixture as mentioned above, which can conveniently grind a complete set of machine planer blades at one time, thus providing the same cutting angle for maximum efficiency and quality of work.

All of the foregoing and still further objects and advantages of this invention will become apparent from a study of the following specification, taken in connection with the accompanying drawing, wherein:

FIGURE 1 is a perspective view of a grinder attachment fixture made in accordance with the present invention;

FIGURE 2 is a top plan view of the assembly shown in FIGURE 1;

FIGURE 3 is a front plan view of the device shown in FIGURE 1, illustrating the manner in which the grinding wheel is brought into contact with the work; and FIGURE 4 is a transverse cross sectional view taken along line 4—4 of FIGURE 2.

Referring now to the drawing, a grinder attachment fixture 10 made in accordance with the present invention is shown to include a base plate 12 and end plate 14 of hardwood, such as oak, for clamped support upon the bed plate of a radial type saw in which the saw blade has been replaced with a grinding wheel 62, as shown in FIGURE 3. The base plate 12 is thus clamped to the bed plate of the apparatus with the longitudinal axis thereof lying in a plane common to the central plane of the grinding wheel 62.

A cradle having a bottom plate 16 and a pair of upstanding end plates 20 of steel plate, or the like, is adjustably secured to the base plate 12, such as by bolts 18, sufficient adjustment being provided to level the cradle relative to the bed of the radial grinding device.

A stationary center 22 is secured to one end plate 20 of the cradle, whereas the other end plate 20 of the cradle has a nut 26 integrally secured thereto for threadedly supporting an adjustable center 28 having a handle 32 for manual adjustment. A lock nut 34 carried by the adjustable center 28, thus effectively clamps the adjustable center in its desired adjusted position, so that the points 24, 30 of the fixed and adjustable centers securely support an elongated cylindrical work holder 36 therebetween.

The cylindrical work holder 36 has a periphery that defines a plurality of longitudinally extending stepped ridges 38 for receiving a stack of blades 40 to be ground. The ridges 38 are aligned so that the stack of blades 40 are received in face to face engagement with each other, with the opposite ends projecting above the level of the cylindrical work holder 36 for contact by the grinding wheel 62.

A plurality of clamp plates 42, secured in longitudinally spaced apart relationship upon the cylindrical work holder 36, by means of set screws 44, releasably secure sets of blades 40 in place upon the work holder. These sets of blades 40, such as machine planer blades, may thus be simultaneously ground to produce cutting edges lying at fixed angles relative to the central plane of the blades.

The fixture is also provided with a plate clamp 46 and rocker plate 48, for securing other types of cutting tools to the cylindrical work holder 36, such as hand chisels, hand plane blades, and the like. These blades may thus be clamped between the plate clamp 46 and the adjacent surface of the cylindrical work holder 36 by the same set screws 44 used to secure the clamp plates 42 in place. FIGURE 1 illustrates the device with the plate clamp and rocker plate in place.

An L-shaped rod 50, has one end secured by means of a nut 52 substantially radially of the cylindrical work holder 36. The opposite end of the L-shaped rod 50 is slidably received within a ferrule 54 which is rotatably adjustably secured to the front end plate 20 of the cradle. A pair of lock nuts 56 threadedly carried by the end of the rod 50, may be tightened against opposite sides of the ferrule 54 to secure the rod 50 in any desired adjusted position. It will thus be recognized that by adjusting the position of the rod 50, the cylindrical work holder 36 may be adjusted about its longitudinal axis, to thus vary the cutting angle between the upwardly projecting ends of the work pieces and the grinding surface of the grinding wheel 62. The upper end of the rod 50 is permitted to pivot relative to the work holder 36, in a similar manner to the pivoting of the ferrule 54 relative to the cradle, to allow for the limited angular adjustment of the work holder. Thus, sufficient adjustment is provided to vary the cutting angle of the work pieces for various types of tools.

The rear end of the cradle includes a dressing tool 58. This tool 58 is adjustably mounted upon one end of a rod 60 that is pivotally secured to the outer end of a carrier 64 by means of a hinge pin 62. The carrier 64 is secured upon the fixed center 22. Thus, the dressing tool 58 may be used to dress the cutting wheel 62, and then hinged in the direction of the arrow as shown in FIGURE 1 about the hinge pin 62 to an inoperative position. The carrier 64 may then be rotated upon the fixed center 22 to a lowered position, to avoid accidental contact of the grinding wheel 62 therewith.

It will now be recognized that an extremely compact and accurate fixture has been provided for grinding various cutting tools upon a radial saw assembly, in which the grinding wheel 62 is drawn across the cutting edges of the tools being ground in the manner illustrated in FIGURE 3. By varying the angular position of the work holder 36, and by varying the angle of the grinding wheel through the minute adjustments provided by the radial saw apparatus, an extremely accurate and high quality cutting edge can be achieved.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A grinder fixture for radial saws having a bed plate and grinding wheel mounting comprising, in combination, a base plate for clamped support upon the radial saw bed plate beneath the grinding wheel mounting, a cradle adjustably secured upon said base plate, a cylinder rotatably supported upon said cradle having a longitudinal axis lying in a horizontal plane, clamp means carried by said cylinder for clamping blades to be ground upon said cylinder with the upper edges thereof projecting above the upper surface of said cylinder, and screw thread adjustment means acting between said cradle and said cylinder for rotatably adjusting the position of said cylinder upon said cradle to vary the cutting angle of the grinding wheel upon the uppermost edges of the blades to be ground, said cradle comprising a substantially horizontal plate and a pair of upright end pieces, said end pieces having a fixed center at one end and a longitudinally adjustable center at the opposite end axially supporting said cylinder, said cylinder having a periphery defining a plurality of longitudinally extending stepped ridges for receiving a stack of blades to be ground, and said clamp means comprising a plurality of plates secured to said cylinder for pressure engagement with said stack of blades.

2. A grinder fixture for radial saws as set forth in claim 1, wherein said screw threaded means comprises an L-shaped rod having one end radially secured to said cylinder, a ferrule carried by said cradle slidably receiving the opposite end of said rod, and lock nuts carried by said opposite end of said rod adjustably engaging the opposite side of said ferrule.

References Cited in the file of this patent

UNITED STATES PATENTS

| | | |
|---|---|---|
| 310,861 | Hyde et al. | Jan. 13, 1885 |
| 1,626,244 | Lindholm | Apr. 26, 1927 |
| 2,069,097 | Root | Jan. 26, 1937 |

FOREIGN PATENTS

| | | |
|---|---|---|
| 668,905 | France | July 23, 1929 |